(12) United States Patent
Cho et al.

(10) Patent No.: US 8,620,104 B2
(45) Date of Patent: Dec. 31, 2013

(54) MOVEMENT-ADAPTIVE NOISE REDUCTION APPARATUS, IMAGE SIGNAL PROCESSING APPARATUS, IMAGE INPUTTING PROCESSING APPARATUS AND MOVEMENT-ADAPTIVE NOISE REDUCTION METHOD

(71) Applicant: Sony Corporation, Tokyo (JP)

(72) Inventors: Hirotake Cho, Kanagawa (JP); Masahiro Toshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/908,465

(22) Filed: Jun. 3, 2013

(65) Prior Publication Data

US 2013/0265496 A1  Oct. 10, 2013

Related U.S. Application Data

(62) Division of application No. 12/457,015, filed on May 29, 2009, now Pat. No. 8,472,750.

(30) Foreign Application Priority Data

Jun. 19, 2008 (JP) .................................. 2008-160653

(51) Int. Cl.
*G06K 9/40* (2006.01)

(52) U.S. Cl.
USPC ............ 382/275; 382/261; 348/620; 348/666

(58) Field of Classification Search
USPC .............. 348/431.1, 451, 452, 610, 620, 666, 348/669; 358/3.04, 3.05, 3.22; 382/261, 382/275; 386/E9.006, E5.04; 700/28, 173, 700/250

See application file for complete search history.

(56) References Cited

FOREIGN PATENT DOCUMENTS

| JP | 05-328174 | | 12/1993 | |
|---|---|---|---|---|
| JP | 06-038197 | A | 2/1994 | |
| JP | 06038197 | A * | 2/1994 | ............ H04N 7/137 |
| JP | 06-225178 | | 8/1994 | |
| JP | 06225178 | A * | 8/1994 | ............... H04N 5/14 |
| JP | 2000-022991 | A | 1/2000 | |
| JP | 2000-115586 | A | 4/2000 | |
| JP | 2001-160909 | A | 6/2001 | |
| JP | 2002-010106 | A | 1/2002 | |
| JP | 2006-311367 | A | 11/2006 | |
| JP | 2007-213191 | A | 8/2007 | |

OTHER PUBLICATIONS

Japanese Office Action issued Oct. 16, 2012 for corresponding Japanese Office Action 2008-160653.

* cited by examiner

*Primary Examiner* — Gregory F Cunningham
(74) *Attorney, Agent, or Firm* — Rader, Fishman & Grauer PLLC (57) ABSTRACT

Disclosed herein is a movement-adaptive noise reduction apparatus, including a memory, a mixing control section, a movement component extraction section, a low-pass filter section, and a movement decision control section. In the apparatus, the movement decision control section and the low-pass filter section receive, from the outside, information regarding the gain value upon an amplification process to which the image signal is subjected before inputted to the mixing control section to control at least one of the threshold value and the filter characteristic in response to the information.

3 Claims, 5 Drawing Sheets

MOVEMENT-ADAPTIVE NOISE REDUCTION APPARATUS, IMAGE SIGNAL PROCESSING APPARATUS, IMAGE INPUTTING PROCESSING APPARATUS AND MOVEMENT-ADAPTIVE NOISE REDUCTION METHOD

CROSS REFERENCES TO RELATED APPLICATIONS

The present invention is a Divisional application of application Ser. No. 12/457,015, filed on May 29, 2008, and contains subject matter related to Japanese Patent Application JP 2008-160653 filed in the Japanese Patent Office on Jun. 19, 2008, the entire contents of which being incorporated herein by reference.

BACKGROUND OF THE INVENTION

1. Field of the Invention

Embodiments of this invention relate to a movement-adaptive noise reduction apparatus wherein, for example, an image signal in a unit of a frame is stored into a memory and then mixed with a next image signal at a predetermined mixture ratio which is adaptively varied in response to a movement of an image. The embodiments of the present invention further relate to an image signal processing apparatus having a movement-adaptive noise reduction circuit and an amplifier provided at a preceding stage to the movement-adaptive noise reduction circuit, and an image inputting processing apparatus such as a camera apparatus which includes an image pickup device and so forth in addition to the image signal processing apparatus. The embodiments of the present invention relate also to a movement-adaptive noise reduction method.

2. Description of the Related Art

An image signal or a video signal includes information of a color and a luminance in a time series in a unit of a screen image or more finely in a unit of a pixel. Generally, a display period or a signal interval of one screen image is called frame. Further, an image of this basic unit is hereinafter referred to as frame image or 1F image.

An image, particularly of a dynamic picture, has a high correlation between frames, and a movement-adaptive noise reduction method which utilizes this correlation to remove noise while preventing blurring of a dynamic picture is known and disclosed, for example, in Japanese Patent Laid-Open No. Hei 05-328174 (hereinafter referred to as Patent Document 1) and Japanese Patent Laid-Open No. Hei 06-225178 (hereinafter referred to as Patent Document 2).

According to the method, an image preceding by one screen image is stored into a frame memory and is mixed at a predetermined mixture ratio with an image of a succeeding frame. Successive images have a high correlation, and even in a dynamic image which exhibits a large movement, successive images have some correlation. In contrast, noise components have little correlation. Therefore, if images of two successive frames which include noise are mixed, then the noise components partly cancel each other to reduce the noise level. This image mixture and storage into a frame memory after the mixture are cyclically executed along a feedback path including the frame memory. Consequently, for example, if the mixture ratio is 1:1 (mixture coefficient K=0.5) and the noise level decreases to one half for each one frame, then the noise can be suppressed sufficiently in ten and several frames to approximately several tens of frames. Such a process as just described is called frame-cyclic noise reduction filtering or three-dimensional noise reduction (3DNR).

However, in the case of a dynamic picture, if the mixture coefficient K is set to a high value, then an after-image appears. Therefore, it is necessary to adaptively control the mixture coefficient K depending upon whether a dynamic picture or a still picture is handled.

In order to satisfy the demand just described, each of the circuits disclosed in Patent Documents 1 and 2 includes a subtractor and a movement decision section. The subtractor calculates the difference between an image signal before mixture and another image signal in a frame memory in order to extract a movement component. The movement decision section carries out movement decision based on the movement component outputted from the subtractor and controls the mixture coefficient K in response to a result of the decision.

Further, since generation of a movement coefficient by the circuit is carried out by calculation of the difference between two successive image signals which have a high correction but have different noise levels, the movement component inevitably includes noise components. In the movement decision, it is decided that, for example, where the movement component is higher than a threshold value, it is decided that the images are a dynamic picture, but where the movement component is lower, the images are a still picture. Therefore, it is desirable to remove noise components as much as possible from a movement component.

The circuits disclosed in Patent Documents 1 and 2 are common in that they include a low-pass filter (LPF) for removing noise components.

In the circuit disclosed in Patent Document 1, low-pass filtering is applied to a movement component outputted from the subtractor.

On the other hand, in the circuit disclosed in Patent Document 2, low-pass filtering is applied to a current image signal before inputted to the subtractor.

SUMMARY OF THE INVENTION

Although a low-pass filter removes high frequency components in which noise is included much, high frequency components include not only noise but also steep edge information in an image. Therefore, if strong low-pass filtering is normally applied, then this gives rise to a disadvantage that the image lacks in edge information and is blurred.

Accordingly, it cannot be avoided to set the noise reduction capacitor which depends upon the filter characteristic of the low-pass filter to a somewhat low value. Therefore, the accuracy in movement detection cannot be made sufficiently high, and as a result, noise reduction filtering of the frame cyclic type which is based on image mixture and mixture ratio variation is subject to sacrifice of the performance or the responsiveness. On the contrary, if the noise reduction capacity of the low-pass filter is set high in order to suppress noise of a movement component to raise the performance or responsiveness of noise reduction filtering of the frame cyclic type, then blurring of an image appears.

Therefore, the circuits disclosed in Patent Documents 1 and 2 have a technical difficulty by the tradeoff described above. As a result, even with a still picture or with a dynamic picture which exhibits small movement, usually the mixture coefficient K cannot be made very high from a point of view of priority of the picture quality, and as a result, the speed of noise removal cannot be avoided to become lower.

Particularly in an image inputting processing apparatus such as a camera apparatus, the brightness of an image source of an input image, that is, the dynamic range of an input image signal, varies by a great amount in response to the image pickup environment. If this variation amount is great, then a problem of drop of the accuracy or input range saturation in a later process occurs. Therefore, in order to adjust the signal level to a fixed level, the image signal is variably amplified by an amplifier, that is, by a gain amplified.

However, if the amplification factor or gain value of the gain amplifier varies by a great amount, then the noise level varies by a great amount. From this reason, if the noise level increases suddenly, then the convergence of the noise level is liable to drop extremely.

Therefore, it is desirable to provide a movement-adaptive noise reduction apparatus which can raise the speed of noise removal or the convergence of the noise level without giving rise to blurring of an image by an after-image.

Also it is desirable to provide an image signal processing apparatus which includes an amplifier in addition to a circuit having a function same as the movement-adaptive noise reduction apparatus described above and an image inputting apparatus such as a camera apparatus which includes an image inputting section including an image pickup device in addition to such an image signal processing apparatus as just described.

Further, it is desirable to provide a movement-adaptive noise reduction method which can raise the convergence of the noise level without giving rise to blurring of an image by an after-image.

According to an embodiment of the present invention, there is provided a movement-adaptive noise reduction apparatus including a memory for successively storing an image signal in a time series, a mixing control section configured to mix a current image signal before inputted to the memory with a preceding image signal preceding by one screen image stored in the memory in response to a given mixture ratio and output the current image signal from which noise is reduced by the mixing to the outside and to store the current image signal after the mixing into the memory so as to be mixed with a next image signal, a movement component extraction section configured to extract a movement component from the current image signal before the mixing and the preceding image signal preceding at least one screen image stored in the memory, a low-pass filter section having a variable filter characteristic for reducing noise from the movement component, and a movement decision control section configured to compare the movement component with a threshold value to carry out movement decision and control the mixture ratio in response to a result of the movement decision, the movement decision control section and the low-pass filter section receiving, from the outside, information regarding the gain value upon an amplification process to which the image signal is subjected before inputted to the mixing control section to control at least one of the threshold value and the filter characteristic in response to the information.

Preferably, the movement decision control section carries out control of raising the threshold value for the movement decision as the gain value input increases within a region equal to or lower than a predetermined gain which defines an upper limit.

Or preferably, the low-pass filter section includes a plurality of low-pass filters having different noise reduction capacities in accordance with a filter characteristic, and a switch for changing over the low-pass filters so that one of the low-pass filters which corresponds to the gain value is connected between the input side of the current image signal and the movement component extraction section.

Further preferably, the low-pass filter section includes a plurality of preceding image low-pass filters having different noise reduction capacities in accordance with a filter characteristic, and a preceding image switch for changing over the preceding image low-pass filters so that one of the preceding image low-pass filters which corresponds to the gain value is connected between the memory and the movement component extraction section.

Or, the low-pass filter section may be a current image low-pass filter section to which the current image signal before the mixing is inputted, the movement component extraction section including a subtractor for subtracting the preceding image signal stored in the memory from the current image signal from the current image low-pass filter section, the movement-adaptive noise reduction apparatus further including a preceding image signal low-pass filter section provided between the memory and the subtractor for removing high frequency components of the preceding image signal in accordance with a filter characteristic thereof.

According to another embodiment of the present invention, there is provided an image signal processing apparatus including an amplifier for amplifying an image signal in a time series with a gain value given thereto, and a movement-adaptive noise reduction circuit including a memory for successively storing the image signal in a time series, a mixing control section configured to mix a current image signal after amplified by the amplifier with a preceding image signal stored in the memory in response to a given mixture ratio and output the current image signal from which noise is reduced by the mixing to the outside and to store the current image signal after the mixing into the memory so as to be mixed with a next image signal, a movement component extraction section configured to extract a movement component from the current image signal before the mixing and the preceding image signal preceding at least one screen image stored in the memory, a low-pass filter section having a variable filter characteristic for reducing noise from the movement component, and a movement decision control section configured to compare the movement component with a threshold value to carry out movement decision and control the mixture ratio in response to a result of the movement decision, the movement decision control section and the low-pass filter section receiving, from the outside, information regarding the gain value upon the amplification process to which the image signal is subjected before inputted to the mixing control section to control at least one of the threshold value and the filter characteristic in response to the information.

In the movement-adaptive noise reduction apparatus and the image signal processing apparatus, an image signal is inputted in a time series. This image signal has been amplified by a process at a preceding stage. Information regarding the gain value upon such amplification is inputted from the outside to the movement-adaptive noise reduction apparatus or circuit. This information is, for example, the gain value itself or a control signal which varies in response to the gain value.

The inputted image signal is subjected to noise reduction by the mixture control section in a unit of an image included in a time series in the signal and then stored into the memory.

The mixture control section mixes the image signal of an object of processing, that is, a current image signal, with a preceding image signal preceding by one screen image stored in the memory in response to a mixture ratio given thereto. Then, the mixture control section outputs the current image signal from which noise is reduced by the mixing to the outside. Simultaneously, the mixture control section stores the current image signal after the mixing into the memory in order to be mixed with a next image signal.

On the other hand, the movement-adaptive noise reduction apparatus or circuit includes, as a configuration for controlling the mixture ratio in response to a movement of an image in parallel to the operation of the mixture control section, the low-pass filter section, movement component extraction section and movement decision section.

The movement component extraction section extracts a movement component from the current image signal before the mixing and the preceding image signal preceding at least by one screen image stored in the memory. For example, the movement component extraction section calculates the difference for every pixel of a screen image and determines an integrated value of the difference for one screen image as a movement component.

The low-pass filter section receives, for example, the current image signal before the mixing or the movement component and carries out a filter process for noise reduction.

The movement decision control section compares the movement component with the threshold value to carry out movement decision and controls the mixture ratio in response to a result of the movement decision.

Therefore, in the case of a dynamic picture which includes a comparatively great amount of movement components, an after-image becomes less likely to appear, for example, by reducing the mixture ratio. In this instance, since the image is a dynamic picture, even if the mixture ratio is set low, noise does not stand out.

On the other hand, in the case of a still picture which includes a comparatively small mount of movement components, priority is put on the noise reduction, for example, by raising the mixture ratio. In this instance, since the image is a still picture, it is free from an after-image.

It is to be noted that, if the image is between a dynamic picture wherein the mixture ratio should be set to a low value and a still picture, that is, an image of a dynamic picture which includes a small amount of movement, the mixture ratio is set to an intermediate value so as to balance the noise reduction and the after-image suppression therebetween.

In the movement-adaptive noise reduction apparatus and the image signal processing apparatus, a movement-adaptive noise reduction process in response to information regarding the gain value inputted from the outside is executed.

In particular, this process is applicable to three different cases including a case wherein the threshold value of the movement decision control section is controlled in response to the gain value, another case wherein the filter characteristic of the (current image) low-pass filter section is varied by a control signal based on the gain value or the like, and a further case wherein both of them are carried out.

Here, where the gain value is high, also noise is amplified by the amplifier at the preceding stage and the level of the noise included in the image signal is high. On the other hand, where the gain value is low, noise is not amplified very much by the amplifier at the preceding stage, and therefore, the level of the noise included in the image signal is low.

It is desirable to achieve appropriate control of the relationship between the threshold value and the noise level. In other words, for the appropriate control, when the noise level is high, it is necessary to raise the threshold value or suppress the noise level. On the contrary, when the noise level is low, there is a margin wherein no wrong decision is made even if the threshold value is lowered.

In the embodiments of the invention described above, at least one of the threshold value control in response to the gain value and the control of varying the filter characteristic to reduce the noise level is carried out to achieve the appropriate control described above. Consequently, a drop of the accuracy in movement decision, in which the threshold value is used, by the noise level is prevented, and the width of adaptive control within which the threshold value is varied by a great amount is expanded. As a result, the speed of noise reduction rises.

According to a further embodiment of the present invention, there is provided a movement-adaptive noise reduction apparatus including a memory for successively storing an image signal in a time series, a mixing control section configured to mix a current image signal before inputted to the memory with a preceding image signal preceding by one screen image stored in the memory in response to a given mixture ratio and output a current image signal from which noise is reduced by the mixing to the outside and to store the current image signal after the mixing into the memory so as to be mixed with a next image signal, a movement component extraction section configured to extract a movement component from the current image signal before the mixing and the preceding image signal preceding at least by one screen image stored in the memory, and a movement decision control section configured to compare the movement component with a threshold value to carry out movement decision and control the mixture ratio in response to a result of the movement decision, the movement decision control section receiving, from the outside, information regarding the gain value upon an amplification process to which the image signal is subjected before inputted to the mixing control section to control the threshold value in response to the information.

According to a still further embodiment of the present invention, there is provided an image inputting processing apparatus including an image inputting section including an image pickup device, an amplifier for amplifying an image signal in a time series from the image pickup device with a gain value given thereto, an analog to digital converter for converting the image signal after the amplification into a digital image signal, and a movement-adaptive noise reduction circuit for reducing noise of the digital image signal in response to a movement of an image, the movement-adaptive noise reduction circuit including a memory for successively storing the image signal in a time series, a mixing control section configured to mix a current image signal after amplified by the amplifier with a preceding image signal stored in the memory in response to a given mixture ratio and output the current image signal from which noise is reduced by the mixing to the outside and to store the current image signal after the mixing into the memory so as to be mixed with a next image signal, a movement component extraction section configured to extract a movement component from the current image signal before the mixing and the preceding image signal preceding at least one screen image stored in the memory, a low-pass filter section having a variable filter characteristic for reducing noise from the movement component, and a movement decision control section configured to compare the movement component with a threshold value to carry out movement decision and control the mixture ratio in response to a result of the movement decision, the movement decision control section and the low-pass filter section receiving information regarding the gain value from the outside to control at least one of the threshold value and the filter characteristic in response to the information.

It is to be noted that the first-described movement-adaptive noise reduction apparatus can be applied to an image inputting apparatus similarly as in the case of the image inputting apparatus just described.

Such an image inputting processing apparatus is suitably applied to a camera apparatus. In a camera apparatus, the level of a signal outputted from an image pickup device has a very large dynamic range in response the brightness of an image pickup object. Therefore, also the gain value of the amplifier varies dynamically, and as a result, also the noise level in the image signal varies by a great amount.

Therefore, that, according to an embodiment of the present invention, the width of adaptive control within which the threshold value is varied by a great amount is expanded and consequently the speed of noise reduction rises as described above contributes significantly to enhancement of the product performance.

According to a yet further embodiment of the present invention, there is provided a movement-adaptive noise reduction method including the steps of receiving an image signal amplified with a given gain value in a time series, mixing a received current image signal with a preceding image signal preceding by one screen image stored in a memory in response to a given mixture ratio, outputting the current image signal from which noise is reduced by the mixing to the outside and storing the current image signal after the mixing into the memory so as to be mixed with a next image signal, extracting a movement component from the current image signal before the mixing and the preceding image signal preceding at least one screen image stored in the memory, applying a filter process for reducing noise from the movement component with a variable filter characteristic, comparing the movement component with a threshold value to carry out movement decision, and controlling the mixture ratio in response to a result of the movement decision, at least one of the threshold value upon the filter process for the current image signal and the filter characteristic being controlled in response to the magnitude of the gain value.

In summary, the embodiments of the present invention can provide a movement-adaptive noise reduction apparatus which can raise the speed of noise reduction or the convergence of the noise level without giving rise to blurring of an image by an after-image.

Further, the embodiments of the present invention can provide an image signal processing apparatus which includes an amplifier in addition to a circuit having a function same as the movement-adaptive noise reduction apparatus described above and an image inputting apparatus such as a camera apparatus which includes an image inputting section including an image pickup device in addition to such an image signal processing apparatus as just described.

Furthermore, the embodiments of the present invention can provide a movement-adaptive noise reduction method which can raise the convergence of the noise level without giving rise to blurring of an image by an after-image.

The above and other features and advantages of the embodiments of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, embodiments of the present invention are described in detail with reference to the accompanying drawings taking a signal processing circuit, an apparatus which implements a circuit of IC (integrated circuit) parts, a substrate and so forth and a camera apparatus which incorporates such a circuit or apparatus as just mentioned as an example.

It is to be noted that it is a significant characteristic of the embodiments of the present invention that control for noise reduction is carried out in response to information relating to a gain value inputted from the outside. Then, the control is carried out in three different manners including a manner wherein the threshold value for movement decision, another manner wherein a filter characteristic for reducing noise from a movement component is controlled and a further manner wherein both of the threshold value and the filter characteristic are controlled.

In the following, the three manners are described in detail in connection with several more particular embodiments.

First Embodiment

Figure 1:
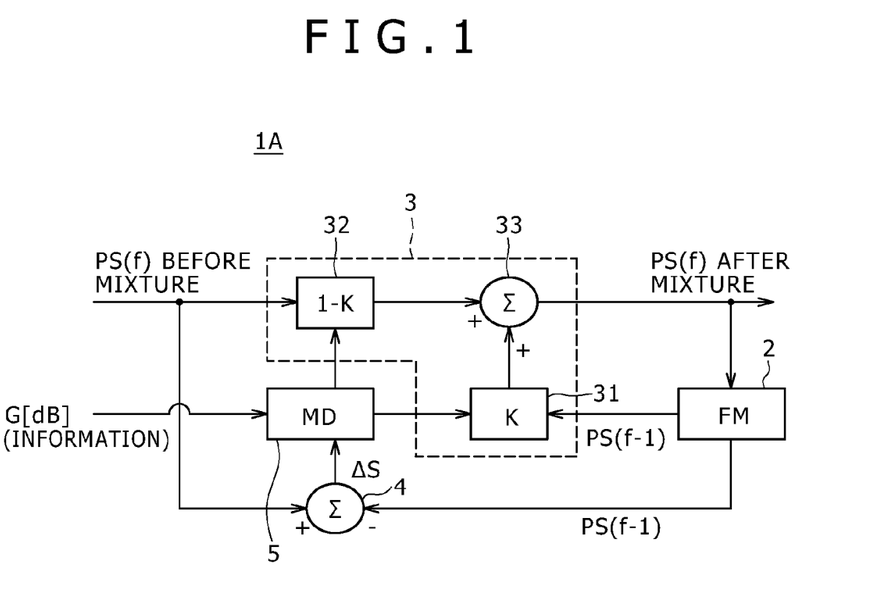
FIG. 1 is a block diagram of a movement-adaptive noise reduction apparatus according to a first embodiment of the present invention.

FIG. 1 is a block diagram of a movement-adaptive noise reduction apparatus according to a first embodiment of the present invention.

Referring to FIG. 1, the movement-adaptive noise reduction apparatus 1A shown includes a frame memory (FM) 2 for storing an image in a unit of a frame, a mixing control section 3, a subtractor 4 as a movement component extraction section, and a movement decision (MD) control section 5.

The frame memory 2, mixing control section 3, subtractor 4 and movement decision control section 5 shown in FIG. 1 are managed and controlled by a general control section such as a CPU (central processing unit) not shown to individually carry out predetermined processes. The term "mixing control section" used herein includes the mixing control section 3 and the general control section which controls the mixing control section 3. Further, the term "movement decision control section" used herein includes the movement decision control section 5 and the general control section which controls the movement decision control section 5.

The mixing control section 3 includes a first multiplier 31, a second multiplier 32 and an adder 33 as a mixing section.

The frame memory 2 successively receives an image signal from an output of the mixing control section 3, more particularly from an output of the adder 33 and stores the image signal in a unit of a frame.

In the state of FIG. 1, a current image signal PS(f) is inputted to the movement-adaptive noise reduction apparatus 1A and makes a current processing object. At this time, a preceding image signal PS(f−1) preceding by one screen (1F) to the current image signal PS(f) is read out from the frame memory 2 and inputted to the first multiplier 31. Here, the reference character "f" represents an identification number of a current image signal or a current frame image, and "f−1" represents a preceding image signal preceding by 1F or a frame image preceding by 1F. This expression is applied also in the following description.

The first multiplier 31 multiplies the preceding image signal PS(f−1) inputted thereto by a mixture ratio K (<1) and outputs a resulting signal.

The second multiplier 32 multiplies the current image signal PS(f) inputted thereto by a complement K−1 (hereinafter referred to as mixed inverse ratio) of the mixture ratio K with respect to "1" and outputs a resulting signal.

The adder 33 adds or mixes an output of the first multiplier 31 and an output of the second multiplier 32 and outputs a resulting signal to the outside. At this time, since the image signal or frame image applied to the input of the frame memory 2 changes over, the frame memory 2 fetches and temporarily stores the current image signal after the mixing.

It is to be noted that the representation that the frame memory 2 stores an image signal in a unit of a screen image F signifies that the storage capacity of the frame memory 2 is equal to an integral number of times the capacity of one frame (actually, however, is sufficient if it is equal to one time). The image signal is a set of data for each pixel, and addition or multiplication by the mixing control section 3 is carried out between data for each two pixels which have the same address in the screen image. Therefore, data for each pixel after mixture is outputted in a time series from the adder 33. The frame memory 2 successively receives and stores the outputted data for each pixel. Similarly, the frame memory 2 successively outputs data for each pixel to the first multiplier 31.

The mixture ratio K used for the multiplication by the first multiplier 31 and the mixed inverse ratio K−1 used for the multiplication by the second multiplier 32 are controlled by the movement decision control section 5.

The movement decision control section 5 uses a threshold value to make discrimination between a dynamic picture and a still picture. In order to prepare for finer control based on the degree of the movement, preferably a plurality of threshold values are used.

The movement component extraction section extracts a movement component representative of a degree of movement including no movement in the case of a still picture from an image signal. Although the extraction method of a movement component need not be limited particularly, the method here is to calculate the difference between two successive frames. Therefore, the movement component extraction section is the subtractor 4 itself. The subtractor 4 receives a current image signal PS(f) before mixing and receives a preceding image signal from the frame memory 2.

It is to be noted that, although the signal in the frame memory 2 used upon image mixing is the preceding image signal PS(f−1), upon movement component detection, the necessity therefor is low. This is because, since various methods are available for movement detection, such modification as to use an image preceding by a plurality of frames from a current frame is possible. Here, since the movement component extraction section is formed from the single subtractor 4, the preceding image signal PS(f−1) preceding by 1F is inputted to the subtractor 4.

The subtractor 4 calculates the difference between the current image signal PS(f) and the preceding image signal PS(f−1) to produce a movement component ΔS and outputs the movement component ΔS to the movement decision control section 5. The movement decision control section 5 controls the mixture ratio K in response to the magnitude of the movement component ΔS inputted thereto.

In the present embodiment, the movement decision control section 5 receives a gain value G from the outside and controls the mixture ratio K in response to the gain value G.

The information to be inputted is not limited to the gain value G itself but may be any value which corresponds to the gain value G. For example, as a method of specifying one mixture ratio K from combinations of the movement component ΔS and the gain value G, for example, a table or memory for outputting the mixture ratio K in response to inputs of the movement component ΔS and the gain value G. In this instance, the information to be inputted may be an address of the memory corresponding to the gain value G.

However, where the table is used, since it has various values of the movement component ΔS and the gain value G, it is not practical to set the mixture ratio K for all combinations of them. Further, where the operation speed, that is, the real time processing performance, of the mixing control section 3 is taken into consideration, generally it is desirable also to avoid controlling the mixture ratio K with unnecessarily high fineness. Therefore, the mixture ratio K may be varied with a certain width, for example, with a pitch of 0.1 so as to provide a data storage structure of a table wherein the movement component ΔS and gain value G corresponding to one mixture ratio K and a combination of them individually have some width.

Where input information is provided with a width corresponding to the mixture ratio K, the width of the input information is defined by a threshold value. Then, it is assumed that, for a certain movement component ΔS, the mixture ratio K is, for example, 0.2. In this instance, in the present embodiment, if different input information such as the gain value G or information relating to the gain value G is given as a parameter, then the mixture ratio K which originally is 0.2 changes, for example, to 0.1 or reversely to 0.3 in response to the parameter value, and the output varies. This can be regarded equivalent to that the threshold value for determining the output corresponding to the input of the mixture ratio K imaginarily varies.

In the control of the present embodiment, "the threshold value changes in response to information regarding the gain value" including a case wherein such a table as described above is used.

However, with the method described above wherein a table is utilized, the number of parameters is great and an increased circuit scale and cost are required.

Therefore, a controlling method of the mixing ratio which requires little memory resource upon processing and is practical and preferable is described below.

Figure 2:
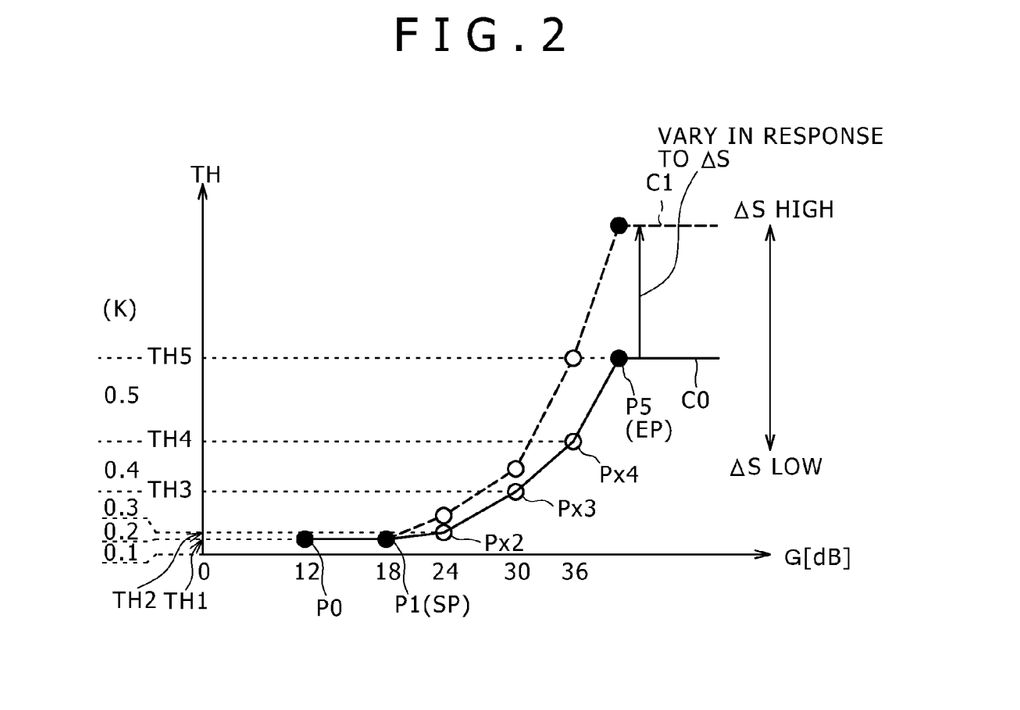
FIG. 2 is a graph illustrating a relationship of a gain value and a threshold value suitably usable in a movement-adaptive noise reduction method according to the first embodiment of the present invention.

FIG. 2 is a graph illustrating a relationship between the gain value G and the threshold value TH.

In FIG. 2, the axis of abscissa indicates the gain value G [dB], and the axis of ordinate indicates the threshold value TH. In the present embodiment, also control by which the threshold value TH increases as the gain value G increases on the whole is carried out.

However, when the gain value G is sufficiently low, since it is estimated that also the noise level is low, the necessity to vary the threshold value TH is low. At this time, in order to avoid useless increase of the processing burden, in the variation of the threshold value TH, the start point SP of the control is set, for example, to the second parameter P1 (gain value is 18 [dB]) from the smaller side.

On the other hand, where the gain value becomes, for example, approximately 50 [dB] or more, since it is estimated that the noise level in this region is very high, it is originally necessary to increase the mixture ratio K to raise the noise reduction speed.

However, if the threshold value TH is made excessively high in order to increase the mixture ratio K, then an after-image becomes liable to appear. Since an after-image is particularly noticeable, it is a good policy to somewhat sacrifice the noise reduction speed and put priority on prevention of appearance of an after-image. Therefore, in the present embodiment, the end point EP of control is set, for example, to the storage parameter P5 in the proximity of 50 [dB] while the threshold value TH is fixed at any gain value higher than 50 dB.

In FIG. 2, a solid round mark represents a storage parameter which is set in advance in the inside of the movement decision control section 5 shown in FIG. 1, a memory or a register not shown (for example, a register in the general control section) or the like. Further, in the present embodiment, in order to reduce the memory capacity, the parameters Px2 to Px4 between the start point SP and the end point EP are determined by calculation, for example, by an interpolation process. The parameter determined by the calculation is called calculation parameter and is represented by a void round mark in FIG. 2.

Further, on the axis of ordinate of FIG. 2, the values of the threshold value TH corresponding to the individual parameter values are denoted by TH1, TH2, TH3, TH4 and TH5. As a particular example, it is additionally illustrated in FIG. 2 that the threshold value TH1 is an upper limit to a division whose mixture ratio K is 0.1 and the threshold value TH2 is an upper limit to another division whose mixture ratio K is 0.2. Similarly, it is additionally illustrated in FIG. 2 that the threshold value TH3 is an upper limit to a division whose mixture ratio K is 0.3, the threshold value TH4 is an upper limit to another division whose mixture ratio K is 0.4, and the threshold value TH5 is an upper limit to another division whose mixture ratio K is 0.5.

The movement decision control section 5 shown in FIG. 1 (and the general control section not shown) varies, when the movement component $\Delta S$ to be outputted from the subtractor 4 varies, the initial curve C0 to a different curve such as a curve C1 indicated by a broken line in FIG. 2. More particularly, if the movement component $\Delta S$ increases, then either the variation rate of the storage parameter P5 of the end point EP is increased in response to the increasing amount or the storage parameter P5 having such a high value is read out from a memory or the like and used. Then, the three parameters Px2 to Px4 between the start point SP and the end point EP are determined by calculation, for example, by linear interpolation. Although the interpolation process is not limited to linear interpolation, since only it is necessary to move the parameters at a ratio equal to that of the end point EP, sufficient accuracy can be assured even if they are determined by linear interpolation.

It is to be noted that, where the initial curve C0 shown in FIG. 2 corresponds to a still picture, since only the direction in which the movement increases exists, the direction in which a curve varies is only the positive direction shown in FIG. 2. In contrast, the initial curve C0 may be set to an intermediate level in accordance with an average degree of movement of the camera. In this instance, the curve varies to the positive direction or the negative direction in response to the movement component $\Delta S$. Further, the position of the initial curve may be set arbitrarily in response to a user operation or a mode.

Figures 3A, 3B:
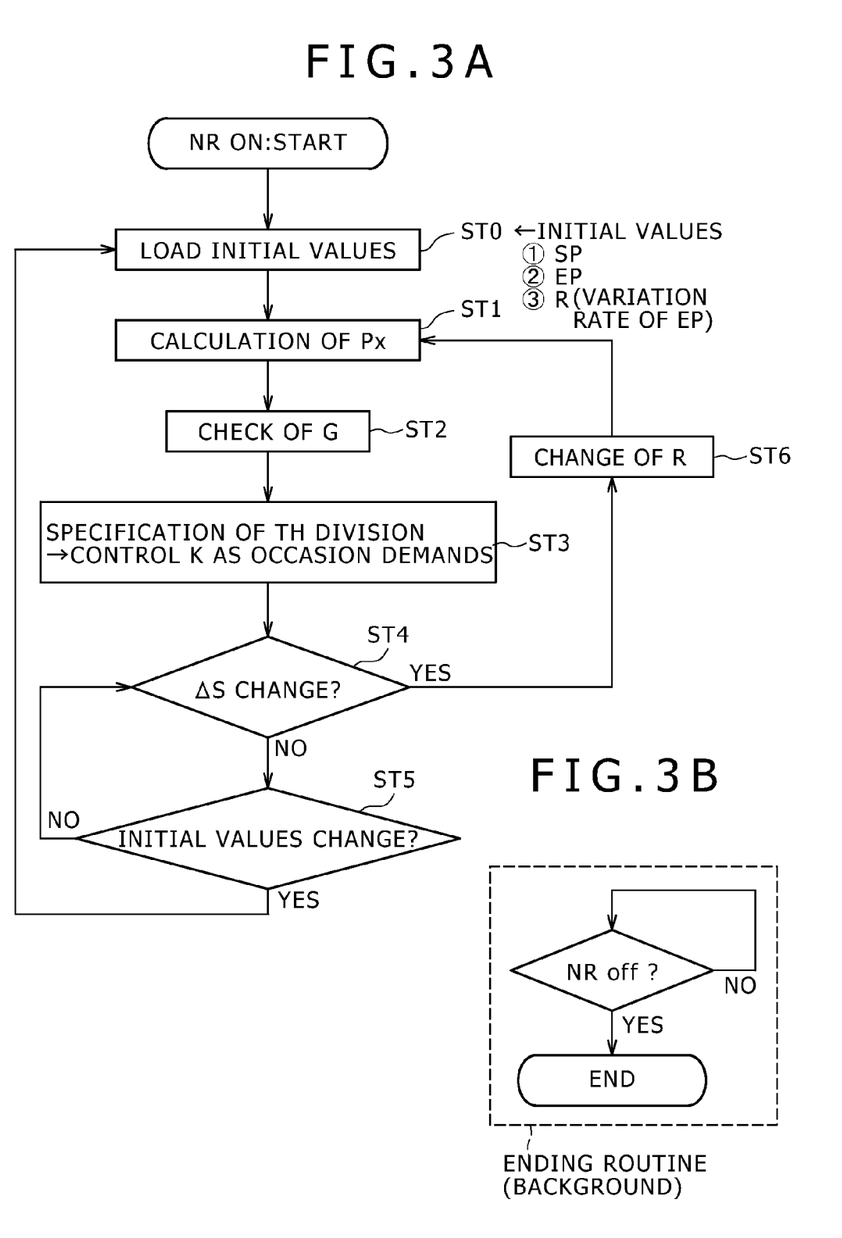
FIGS. 3A and 3B are flow charts illustrating an example of control of the relationship illustrated in FIG. 2.

FIG. 3A illustrates an example of the control.

Referring to FIG. 3A, after a noise reduction (NR) process is started, initial values are loaded at step ST0.

The initial values include, for example, those of position information of the start point SP and position information of the end point EP illustrated in FIG. 2. The position information here indicates two-dimensional coordinate information of the gain value G and the threshold value TH illustrated in FIG. 2. However, not only mere position information but also selection information such as whether a parameter P0 or the parameter P1 should be selected may be included in the initial values.

Further, the initial values include that of the variation rate R of the parameter P5 which serves as the end point EP. This variation rate R has a default value corresponding to one time. However, where priority is put on that the convergence speed of noise is low rather than that an after-image appears or where an image effect is set such that an after-image is produced intentionally or in a like case, the variation rate R of the initial value can be set to a value different from 1 in response to the user or the mode.

The initial values described are read out from an internal or external memory of the movement decision control section 5 shown in FIG. 7, a storage register or the like in the general control section not shown or the like to a register for calculation.

After the loading of the initial values comes to an end, the movement decision control section 5 shown in FIG. 1 or the general control section not shown calculates the parameters Px2 to Px4 at step ST1. Consequently, the initial curve C0 illustrated in FIG. 2 is finally determined.

In this calculation, as an example, the threshold value TH is set to twice the threshold value TH1 (gain of 6 dB) and the threshold value TH3 is set to twice the threshold value TH2 (gain of 6 dB). Also for the gain value G, parameter values which indicate a variation of 6 dB of twice are determined. The movement decision control section 5 or the general control section uses this calculation method to calculate the initial parameters Px2 to Px4.

Then at step ST2, the movement decision control section 5 checks the gain value G from information inputted thereto. Then at step ST3, the movement decision control section 5 checks the finally determined initial curve C0 to specify divisions of the mixture ratio K defined by the threshold value TH corresponds to the gain value G confirmed by the check. The mixture ratio K is determined corresponding to the divisions, and the movement decision control section 5 finds the mixture ratio K to be controlled.

If the mixture ratio K currently outputted to the first multiplier 31 or the second multiplier 32 is equal to the newly found mixture ratio K, then the movement decision control section 5 does not vary the output of the mixing ratio. However, if the mixture ratio K being outputted is different from the newly found mixture ratio K, then the movement decision control section 5 varies the output value thereof to the newly discriminated mixture ratio K. In this instance, the coefficient by which the image signal is to be multiplied by the first multiplier 31 or the second multiplier 32 varies.

At next step ST4, the movement decision control section 5 checks whether or not some variation occurs with the movement component $\Delta S$ from the subtractor 4. This check may be carried out prior to the step ST2. At all events, when the movement component $\Delta S$ varies, the movement decision control section 5 changes the variation rate R in response to the movement component $\Delta S$ after the variation. In this change, the variation rate R may be increased in proportion to the movement component $\Delta S$. Or, the variation rate R may be changed non-linearly with respect to the movement component $\Delta S$. Or else, the variation rate R to be changed in response to the movement component $\Delta S$ may be determined using a table. Otherwise, the sensitivity when the variation rate R is to be changed in response to the movement component $\Delta S$ may be changed by user setting or the like.

Then at step ST5, for example, the general control section supervises the user operation or the mode change to decide whether or not the initial values should be varied. This supervision may be carried out not later than the step ST4 but at an arbitrary position in FIG. 3A. In other words, it may normally be supervised on the background whether or not the initial values should be changed.

When the initial values are to be changed, the processing is returned to step ST0, at which loading of necessary initial values is carried out. Consequently, the processing starts from step ST1 with the new initial values.

It is to be noted that an ending instruction of noise reduction is supervised on the background as seen from FIG. 3B, and if this instruction is detected, then the process illustrated in FIG. 3A is ended compulsorily.

According to the present embodiment, when the mixture ratio K is to be changed in response to the movement component ΔS, also the gain value G is used as a parameter for the change. At this time, the fact that the image signal has a high noise level when the gain value G upon amplification is high but has a low noise level when the gain value G is low is utilized skillfully.

In particular, as the gain value G increases, the mixture ratio K is changed so as to increase on the whole. Consequently, as the noise level rises, the mixture ratio K increases to raise the convergence speed of noise reduction. Conversely speaking, when the noise level is low, the mixture ratio K can be kept fixed at a low value, and consequently, an after-image can be prevented.

On the other hand, if the mixture ratio K becomes excessively high for a dynamic picture which exhibits high speed movement, then an after-image stands out and the picture quality deteriorates. Therefore, as the movement component ΔS increases, the divisions of the threshold values TH are expanded to lower the changing sensitivity of the mixture ratio K. As a result, for the same noise level or gain value, even if the movement component ΔS increases, the mixture ratio K can be kept suppressed to a low level, or even if the mixture ratio K rises, since it rises only with a small width, appearance of an after-image can be prevented effectively.

In this manner, in the present embodiment, it is possible to raise the speed of noise reduction while appearance of an after-image is prevented effectively.

Second Embodiment

Figure 4:
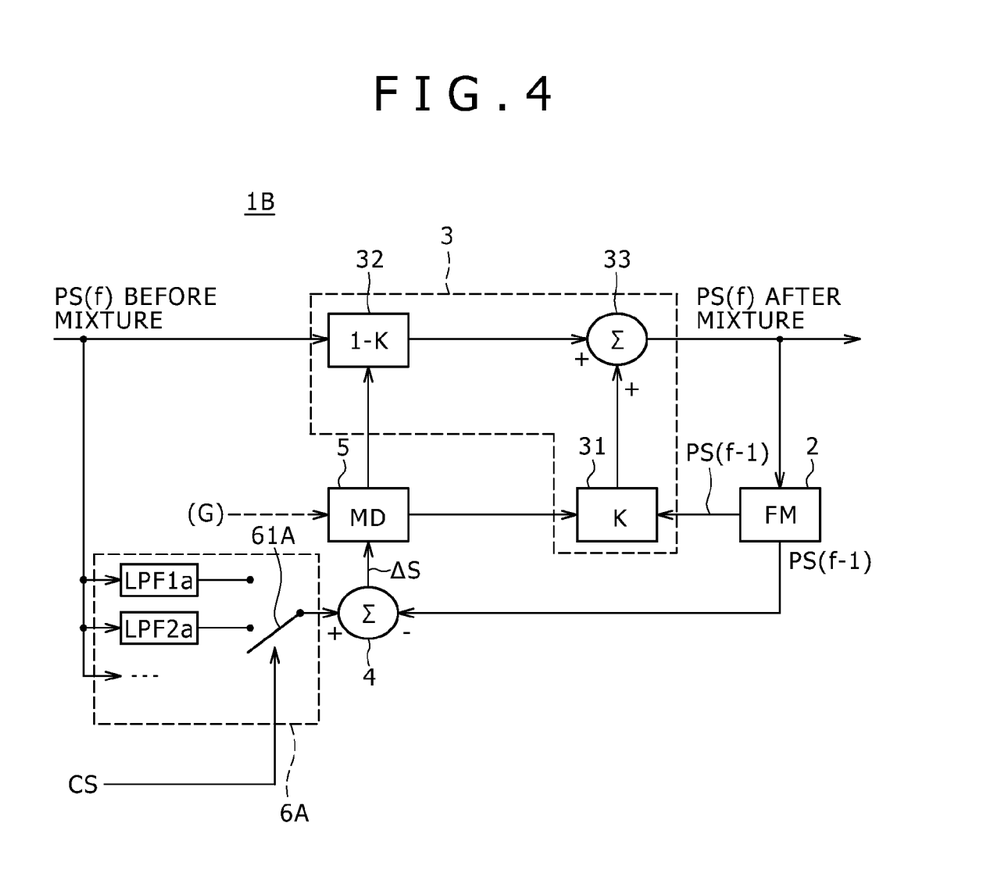
FIGS. 4 and 5 are block diagrams of movement-adaptive noise reduction apparatus according to second and third embodiments of the present invention, respectively.

FIG. 4 shows a movement-adaptive noise reduction apparatus according to a second embodiment of the present invention.

Referring to FIG. 4, the movement-adaptive noise reduction apparatus 1B shown includes a frame memory 2, a mixing control section 3, a subtractor 4 and a movement decision control section 5 similarly as in the movement-adaptive noise reduction apparatus 1A according to the first embodiment of the present invention described above with reference to FIG. 1.

However, the gain value G is not inputted to the movement decision control section 5 of the movement-adaptive noise reduction apparatus 1B according to the second embodiment. The movement decision control section 5 shown in FIG. 4 and a general control section not shown execute control for determining a mixture ratio K which belongs, for example, to one of divisions of the mixture ratio K defined by threshold values or movement component values in response to a movement component ΔS inputted from the subtractor 4. At this time, the movement decision control section 5 does not carry out such threshold value control in response to the gain value G as described hereinabove with reference to FIGS. 2 and 3.

As a configuration which carries out control in place of the threshold value control responsive to the gain value G, the movement-adaptive noise reduction apparatus 1B shown in FIG. 4 includes a current image low-pass filter (LPF) section 6A.

The current image low-pass filter section 6A is provided intermediately of a path along which a current image signal PS(f) before mixing is inputted to the subtractor 4. The current image low-pass filter section 6A includes a plurality of low-pass filters LPF1a, LPF2a, . . . and a single switch 61A. The switch 61A is interposed between the low-pass filters LPF1a, LPF2a, . . . and the subtractor 4, or in other words, in the output side of the current image signal. However, the current image low-pass filter section 6A may be modified such that the switch 61A is provided on the input side of the current image signal.

A control signal CS is inputted from the outside to the switch 61A. The control signal CS is generated as "information relating to the gain value G," for example, by the general control section not shown.

The low-pass filters LPF1a, LPF2a, . . . are formed such that filter characteristics thereof overlap with each other. For example, the low-pass filters LPF1a, LPF2a, . . . include a low-pass filter which applies low-pass filtering strongly or has a high noise reduction capacity and another low-pass filter which applies low-pass filtering weakly or has a low noise reduction capacity.

Such capacity difference is implemented, for example, by increasing the number of taps of a filter or by changing the set of filter coefficients or the like.

Basic operation of the movement-adaptive noise reduction apparatus 1B shown in FIG. 4 is same as that of the movement-adaptive noise reduction apparatus 1A of the first embodiment described hereinabove except that the movement decision control section 5 does not carry out threshold value control in response to the gain value G. Therefore, description of the common operation of the movement-adaptive noise reduction apparatus 1B of the second embodiment to that of the movement-adaptive noise reduction apparatus 1A of the first embodiment is omitted herein to avoid redundancy.

In the following, operation of the current image low-pass filter section 6A provided newly in the movement-adaptive noise reduction apparatus 1B of the second embodiment and advantages or effects provided by the provision of the current image low-pass filter section 6A which has a variable filter characteristic are described. First, description is given of the "effects by the provision of the LPF."

In the movement decision control section 5, a corresponding relationship between the movement component ΔS and the mixture ratio K is determined in advance using a plurality of threshold values. When this corresponding relationship is determined, if the noise margin of the movement component ΔS to the threshold values is set to a great amount, then since the threshold values are individually set to rather high values, there is a tendency that the mixture ratio K becomes unnecessarily low on the whole.

On the other hand, where a LPF is provided, the noise level is reduced from the movement component ΔS in comparison with an alternative case wherein a LPF is not provided. Consequently, the noise margin of the movement component ΔS with respect to the threshold values becomes dramatically small. Therefore, the mixture ratio K is prevented from becoming unnecessarily low on the whole owing to the noise margin. As a result, where a LPF is provided, the mixture ratio K becomes higher, resulting in enhancement of the convergence performance in noise reduction.

It is to be noted that, if a great amount of movement is detected, then the movement decision control section 5 sets the mixture ratio K to a low value. This control is independent of the fact that the mixture ratio K rises due to provision of a LPF.

In the movement-adaptive noise reduction apparatus 1B according to the second embodiment, "variation of a filter characteristic" is possible in addition to "provision of a LPF."

In the movement-adaptive noise reduction apparatus 1B of the second embodiment, when the gain value G is high and it can be estimated that also noise components are high, the general control section not shown controls the control signal CS so that the switch 61A is changed over to a LPF which has a comparatively high noise reduction capacity. On the contrary, when the gain value G is low and it can be estimated that also noise components are low, the general control section not shown controls the control signal CS so that the switch 61A is changed over to a LPF having a comparatively low noise reduction capacity. By the control, noise components of the movement component ΔS to be outputted from the subtractor 4 are suppressed effectively.

On the other hand, where only one low-pass filter (LPF) is provided, it is necessary for the LPF to have a rather high noise reduction capacity taking the possibility of increase of noise components into consideration.

Such a strong LPF as just mentioned sufficiently suppresses high frequency components of an input signal. Therefore, an image passing through the LPF significantly lacks in image information or edge information having a high luminance difference together with reduction of noise components. By the lack, a rising edge or a falling edge of the image signal waveform becomes less steep at an image portion having a luminance difference at which the display color changes, for example, from the black to the white. The image signal whose edge steepness is lost when it passes through the strong LPF is subtracted from the other image signal by the subtractor 4 and is used to generate a movement component ΔS. That the error of the movement component ΔS is great is not preferable because the possibility in wrong decision in control for determining the mixture ratio K increases as much.

Here, if a drop of edge information by such strong LPF occurs, then such an influence or error as that which is provided where a current image is delayed with respect to a preceding image is provided to the movement component ΔS. More particularly, if an edge of the waveform becomes less steep, then also the effective waveform position delays in time and the movement component ΔS becomes great in comparison with an alternative case wherein edge information does not drop. Therefore, the fact itself that a drop of edge information by a strong LPF occurs is decided similarly to that in a case wherein the movement amount increases by the movement decision control section 5. Accordingly, the movement decision control section 5 carries out control to further reduce the mixture ratio K in order to prevent an after-image, and consequently, the noise reduction speed drops by more than a required amount.

In contrast, the current image low-pass filter section 6A provided newly in the movement-adaptive noise reduction apparatus 1B of the present second embodiment applies a strong LPF only when the level of noise components is high, but substantially lowers the noise reduction capacity of the LPF when noise components are low. In other words, the current image low-pass filter section 6A can carry out control of suppressing high frequency components by a necessary amount adaptively in response to the magnitude of noise.

This prevents, together with the effect provided by the provision itself of the LPF, a drop of edge information by changing the LPF to a weaker LPF particularly when the noise level is low. Therefore, a drop of the noise reduction speed by more than a necessary amount arising from a drop of edge information, which is a bad effect of the LPF process described above is prevented effectively.

As the noise level rises, a stronger LPF process is applied and edge information drops. Therefore, it cannot be avoided that the noise reduction speed drops by equal to or more than a necessary amount due to a drop of edge information. However, the noise level rises extremely only where the illuminance of image pickup environment lacks extremely. Further, the advantage that high noise is reduced rapidly and no wrong decision is made is significant rather than the disadvantage just described. Further, with the movement-adaptive noise reduction apparatus 1B of the second embodiment, the noise margin for the threshold value for the movement component ΔS can be reduced dramatically. Accordingly, such a disadvantage that the mixture ratio K becomes unnecessarily high due to the noise margin and this results in appearance of an after-image is prevented.

From the foregoing, with the movement-adaptive noise reduction apparatus 1B of the second embodiment, the convergence performance in noise reduction is enhanced in comparison with an alternative case wherein no LPF is provided. Further, in comparison with a case wherein a filter characteristic of a LPF is fixed, a drop of edge information which is a bad influence of noise reduction can be prevented on the whole. Further, appearance of an after-image arising from a noise margin can be prevented to reduce appearance of an after-image.

From the foregoing, the movement-adaptive noise reduction apparatus 1B according to the second embodiment of the present invention has an advantage similar to that of the movement-adaptive noise reduction apparatus 1A according to the first embodiment, that is, an advantage that the convergence performance in noise reduction is enhanced while appearance of an after-image is prevented.

Third Embodiment

Figure 5:
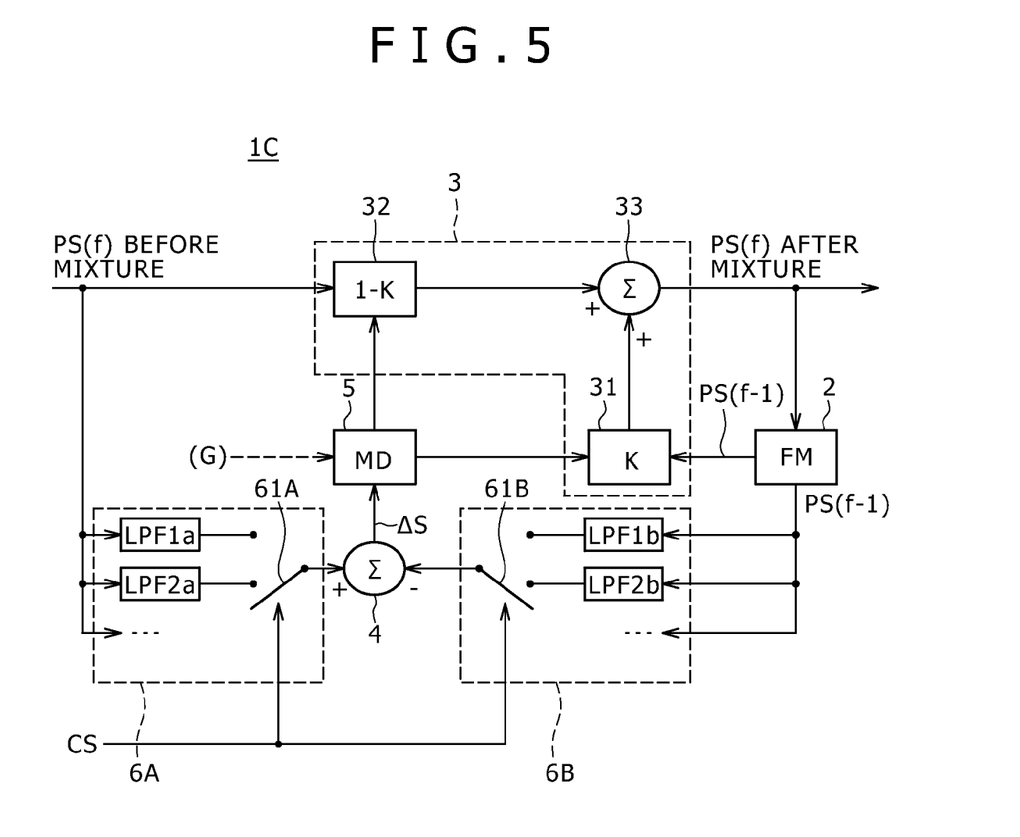

FIG. 5 shows a movement-adaptive noise reduction apparatus according to a third embodiment of the present information.

Referring to FIG. 5, the movement-adaptive noise reduction apparatus 1C shown includes a preceding image low-pass filter section 6B in addition to the components of the movement-adaptive noise reduction apparatus 1B according to the second embodiment described hereinabove with reference to FIG. 4. It is to be noted that description of such common components is omitted herein to avoid redundancy.

The preceding image low-pass filter section 6B is provided between the frame memory 2 and the subtractor 4. The preceding image low-pass filter section 6B includes a plurality of low-pass filters LPF1b, LPF2b, . . . and one switch 61B. The switch 61B is provided between the low-pass filters LPF1b, LPF2b, . . . and the subtractor 4, that is, on the output side of a current image signal. The preceding image low-pass filter section 6B may be modified such that the switch 61B is provided on the input side of the preceding image signal.

A control signal CS is inputted from the outside to the switch 61B. The control signal CS is generated as "information relating to the gain value G," for example, by the general control section not shown.

The low-pass filters LPF1b, LPF2b, . . . are formed such that filter characteristics thereof overlap with each other. For example, the low-pass filters LPF1b, LPF2b, . . . include a low-pass filter which applies low-pass filtering strongly or has a high noise reduction capacity and another low-pass filter which applies low-pass filtering weakly or has a low noise reduction capacity.

Such capacity difference is implemented, for example, by increasing the number of taps of a filter or by changing the set of filter coefficients or the like.

The current image low-pass filter section 6A and the preceding image low-pass filter section 6B are common in the fact itself that they have a plurality of low-pass filters having different filter characteristics.

However, the current image and the preceding image are different in whether or not they have passed through the mixing control section 3 and have different noise levels. Therefore, this may be taken into consideration to form the preceding image low-pass filter section 6B and the current image low-pass filter section 6A so that the noise reduction performance of the corresponding LPF may be lower with the preceding image low-pass filter section 6B than with the current image low-pass filter section 6A. Or, the control signal CS may be controlled so that the noise reduction performance may be lower with the preceding image low-pass filter section 6B than with the current image low-pass filter section 6A in response to the degree of the noise reduction by the mixing control section 3, particularly in response to the value of the mixture ratio K.

In the third embodiment, basic operation of the movement-adaptive noise reduction apparatus 1C is common to that of the movement-adaptive noise reduction apparatus 1B of the second embodiment. Also the effect provided by provision of the preceding image low-pass filter section 6B is common in that noise components are removed from the movement component ΔS.

The movement-adaptive noise reduction apparatus 1C of the third embodiment is further improved in comparison with the movement-adaptive noise reduction apparatus 1B of the second embodiment in that edge information is less likely to drop.

In the movement-adaptive noise reduction apparatus 1B of the second embodiment, a LPF process is applied to only one of current image signals which exhibits a higher noise level. However, while it is only necessary to be able to decrease the noise level on the whole, if a LPF process is applied only to one of image signals, then a bad effect of a drop of edge information increases.

In the movement-adaptive noise reduction apparatus 1C of the third embodiment, since reduction of the noise level can be carried out also by the preceding image low-pass filter section 6B, it is possible to weaken the LPF process to be applied to the current image low-pass filter section 6A as much thereby to prevent a drop of edge information. Further, since the noise level is lowered in two directions, an advantage that a rapid increase of noise can be coped with rapidly is achieved.

On the other hand, if the preceding image low-pass filter section 6B is added, then this gives rises to an increase of the cost by increase of the area and so forth. Whether or not the preceding image low-pass filter section 6B should be added may be determined taking the advantage described above and a disadvantage by increase of the cost into consideration.

Fourth Embodiment

Figure 6:
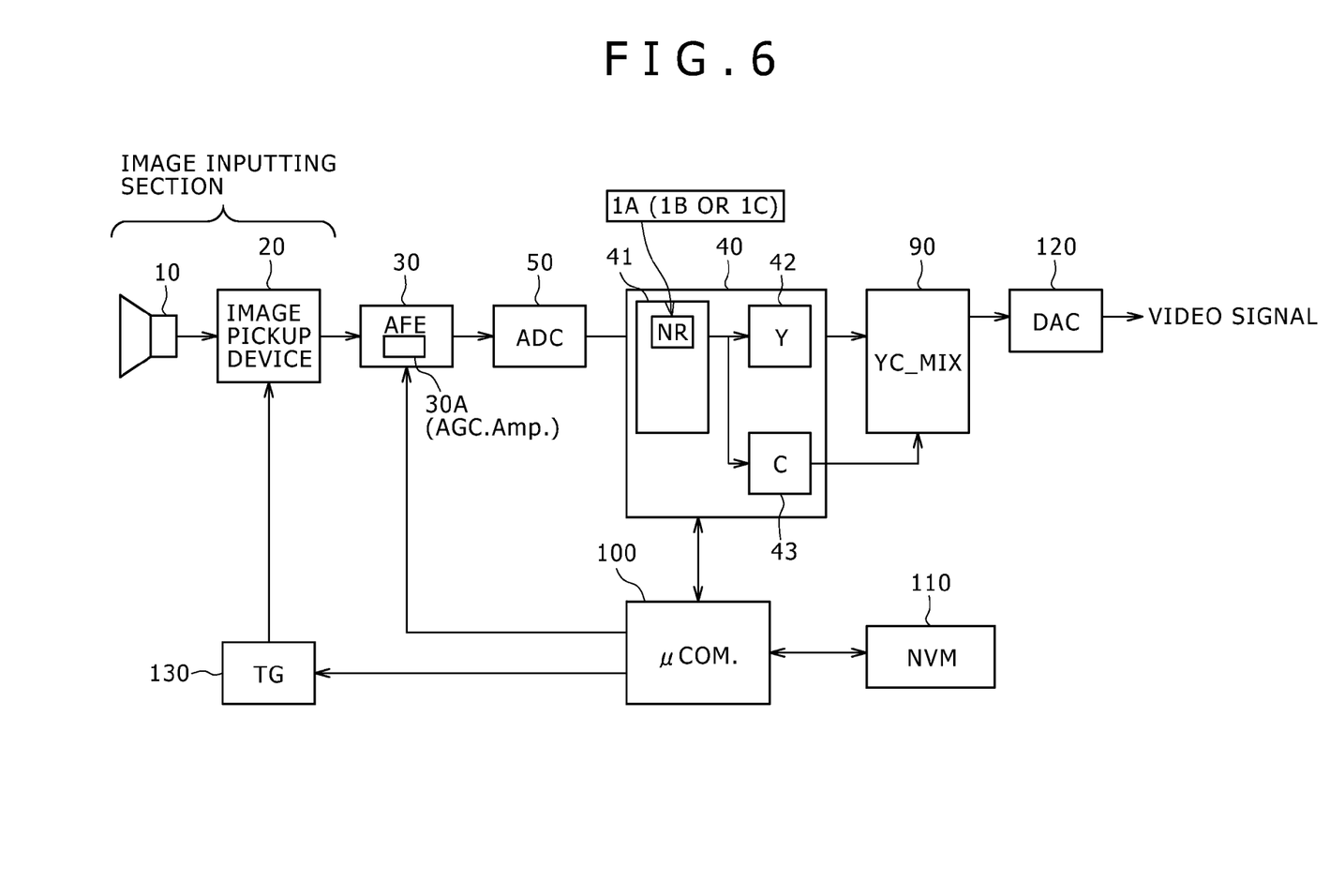
FIG. 6 is a block diagram of a camera apparatus according to a fourth embodiment of the present invention.

FIG. 6 shows a camera apparatus according to a fourth embodiment of the present invention.

Referring to FIG. 6, the camera apparatus corresponds to a form of an "image inputting processing apparatus." The camera apparatus may be any of a video camera principally for image pickup of a dynamic picture and a digital still camera principally for image pickup of a still picture.

The camera apparatus shown in FIG. 6 includes an image inputting section which in turn includes an optical part 10 including a lens and an optical filter and an image pickup device 20. The camera apparatus further includes, as circuit blocks, an analog front end circuit (AFE) 30, an AD converter (ADC) 50, a signal processing circuit 40, a mixing circuit (YC_MIX) 90, and a DA converter (DAC) 120. The camera apparatus further includes, as circuits for a control system and a storage system, a microcomputer (μCOM) 100 as a "general control section," a nonvolatile memory (NVM) 110 and a timing generation circuit (TG) 130.

The optical part 10 accommodates a lens, an iris and so forth in a lens housing. The optical part 10 can carry out focal control and iris control for exposure light amount control and further includes an iris driving section for exposure light control, a driving section for automatic focusing and control circuits for the driving sections.

The image pickup device 20 is a CCD sensor or a CMOS image sensor. The image pickup device 20 is fixed in a camera apparatus body such that it can form, on an image pickup plane thereof, an image of light from an image pickup object introduced thereto through the optical part 10. Further, the image pickup device 20 has a pixel array wherein a large number of optical sensors are disposed in a matrix. If the image pickup device 20 is driven by a driving circuit not shown, then a signal corresponding to the received light amount of each pixel is outputted in a time series from the image pickup device 20.

Where the image pickup device 20 is a CCD sensor, the timing generation circuit (TG) 130 is connected to the image pickup device 20. To the image pickup device 20, a clock signal, a vertical synchronizing signal and a horizontal synchronizing signal can be inputted from the timing generation circuit 130. Where the image pickup device 20 is a CCD sensor, also a transfer pulse synchronized with the vertical synchronizing signal and the horizontal synchronizing signal is supplied from the timing generation circuit 130.

The timing generation circuit 130 generates signals for such timing control from a system clock signal not shown under the control of the microcomputer 100. The image pickup device 20 is controlled to carry out various operations such as a transfer operation and a shutter speed change in accordance with signals for such timing control.

It is to be noted that, where the image pickup device 20 is a CMOS sensor, the function of the timing generation circuit 130 may be provided in the image pickup device 20.

The analog front end circuit 30 receives a pixel signal in the form of an analog signal from the image pickup device 20 and carries out processes to be carry out for an analog signal such as removal of reset noise (in the case of a CCD device) by correlation double sampling, other noise removal and amplification.

As seen in FIG. 6, the analog front end circuit 30 includes an automatic gain control (AGC) amplifier 30A as an "amplifier." The "gain value G" in the first to third embodiments is a control amount which can be controlled, for example, through the automatic gain control amplifier 30A by the microcomputer 100 serving as a "general control section." The microcomputer 100 controls the shutter of the image pickup device 20 and the gain of the automatic gain control amplifier 30A in the analog front end circuit 30 so that the luminance may be fixed among screen images in response to an output of a circuit called optical detector (OPD) not shown which is included in the analog front end circuit 30 or the signal processing circuit 40 and detects the luminance of a screen image.

The AD converter 50 converts the analog signal after the processes into a digital signal of a predetermined number of bits such as 8 or 10 bits.

The signal processing circuit 40 includes a pre-processing section 41, a luminance (Y) signal processing circuit 42 and a color (C) signal processing circuit 43. The pre-processing section 41 includes a circuit corresponding to one of the movement-adaptive noise reduction circuits 1A, 1B and 1C of the first to third embodiments. The circuit mentioned is denoted by reference character "NR" in FIG. 6.

The signal processing circuit 40 may be formed, for example, as an IC in the form of a semiconductor chip or may be provided as a module or a mounting substrate on which a plurality of parts are mounted and may be built in the camera apparatus.

The signal processing circuit 40 is connected between the AD converter 50 and the DA converter 120 and carries out signal amplification as a preprocess, a noise reduction (NR) process, separation of a luminance signal and color signals, a luminance signal process, a color signal process and so forth.

The mixing circuit (YC_MIX) 90 for mixing the luminance signal and the color signals after processed is connected between the signal processing circuit 40 and the DA converter 120. The signal processing circuit 40 may be formed including the signal processing circuit 40 and the mixing circuit 90 or they may be formed as an IC or a module.

The camera apparatus having such a configuration as described above picks up an image of various image pickup objects in various brightness environments. Therefore, different from a television signal with regard to which the brightness is adjusted, an image immediately after picked up by the image pickup device 20 has a very great dynamic range of the brightness. However, if the image is AD converted as it is and is subjected to various signal processes, then since the input signal exceeds the range of the variation width of the input signal level first at the AD converter 50, it is necessary to lower the accuracy of the processing sections or the possibility that increase of the circuit scale may be invited is high. Accordingly, the automatic gain control amplifier 30A in the analog front end circuit 30 is used to carry out control of the signal gain, that is, the amplification factor, in order to adjust the signal level to a certain degree or carry out automatic exposure control.

The gain value G is used upon control of the signal gain. The camera apparatus of the fourth embodiment is configured such that the movement-adaptive noise reduction apparatus described in any of the first to third embodiments is provided in the signal processing circuit 40 and executes a movement-adaptive noise reduction process in response to the gain value G.

Accordingly, also with the camera apparatus of the fourth embodiment, similar advantages to those achieved by the camera apparatus of the first to third embodiments are achieved.

It is to be noted that the configuration shown in FIG. 6 is a mere example and also other configurations may be applied.
<Modification 1>
The configuration shown in FIG. 4 or 5 can be modified so as to allow selective execution of one of a technique for changing the filter characteristic and the threshold value controlling technique illustrated in FIGS. 2 and 3. To this end, it is illustrated in FIGS. 4 and 5 that the gain value G may be inputted along a route indicated by a broken line.

<Modification 2>
Further, as seen in FIG. 4 or 5, in the second and third embodiments, the filter process of the current image low-pass filter section 6A is executed for the current image signal PS(f) before mixing. The filter process is executed to reduce the noise level of the movement component ΔS to be provided to the movement decision control section 5. Therefore, a different configuration wherein the filter process is applied to an output of the subtractor 4 may be used. In this instance, since the movement component is directly LPF processed, the circuit should be devised so that the movement component may not be attenuated.

The present application contains subject matter related to that disclosed in Japanese Priority Patent Application JP 2008-160653 filed in the Japan Patent Office on Jun. 19, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An image signal processing apparatus, comprising:
an amplifier for amplifying an image signal in a time series with a gain value given thereto; and
a movement-adaptive noise reduction circuit including
a memory for successively storing the image signal in a time series,
a mixing control section configured to mix a current image signal after amplified by said amplifier with a preceding image signal stored in said memory in response to a given mixture ratio and output the current image signal from which noise is reduced by the mixing to the outside and to store the current image signal after the mixing into said memory so as to be mixed with a next image signal,
a movement component extraction section configured to extract a movement component from the current image signal before the mixing and the preceding image signal preceding at least one screen image stored in said memory,
a low-pass filter section having a variable filter characteristic for reducing noise from the movement component, and
a movement decision control section configured to compare the movement component with a threshold value to carry out movement decision and control the mixture ratio in response to a result of the movement decision,
said movement decision control section and said low-pass filter section receiving, from the outside, information regarding the gain value upon the amplification process to which the image signal is subjected before inputted to said mixing control section to control at least one of the threshold value and the filter characteristic in response to the information.

2. An image inputting processing apparatus, comprising:
an image inputting section including an image pickup device;
an amplifier for amplifying an image signal in a time series from said image pickup device with a gain value given thereto;
an analog to digital converter for converting the image signal after the amplification into a digital image signal; and a movement-adaptive noise reduction circuit for reducing noise of the digital image signal in response to a movement of an image;

said movement-adaptive noise reduction circuit including
a memory for successively storing the image signal in a time series,
a mixing control section configured to mix a current image signal after amplified by said amplifier with a preceding image signal stored in said memory in response to a given mixture ratio and output the current image signal from which noise is reduced by the mixing to the outside and to store the current image signal after the mixing into said memory so as to be mixed with a next image signal,
a movement component extraction section configured to extract a movement component from the current image signal before the mixing and the preceding image signal preceding at least one screen image stored in said memory,
a low-pass filter section having a variable filter characteristic for reducing noise from the movement component, and
a movement decision control section configured to compare the movement component with a threshold value to carry out movement decision and control the mixture ratio in response to a result of the movement decision, said movement decision control section and said low-pass filter section receiving information regarding the gain value from the outside to control at least one of the threshold value and the filter characteristic in response to the information.

3. A movement-adaptive noise reduction method, comprising the steps of:
receiving an image signal amplified with a given gain value in a time series;
mixing a received current image signal with a preceding image signal preceding by one screen image stored in a memory in response to a given mixture ratio;
outputting the current image signal from which noise is reduced by the mixing to the outside and storing the current image signal after the mixing into the memory so as to be mixed with a next image signal;
extracting a movement component from the current image signal before the mixing and the preceding image signal preceding at least one screen image stored in the memory;
applying a filter process for reducing noise from the movement component with a variable filter characteristic;
comparing the movement component with a threshold value to carry out movement decision; and
controlling the mixture ratio in response to a result of the movement decision;
at least one of the threshold value upon the filter process for the current image signal and the filter characteristic being controlled in response to the magnitude of the gain value.

* * * * *